July 14, 1931.   P. V. FLORIDO   1,814,985

AIRCRAFT LANDING APPARATUS

Filed Nov. 26, 1930    3 Sheets-Sheet 1

INVENTOR.
Pablo V. Florido

BY Lancaster, Allwine and Rommel
ATTORNEYS.

July 14, 1931. P. V. FLORIDO 1,814,985
AIRCRAFT LANDING APPARATUS
Filed Nov. 26. 1930 3 Sheets-Sheet 2
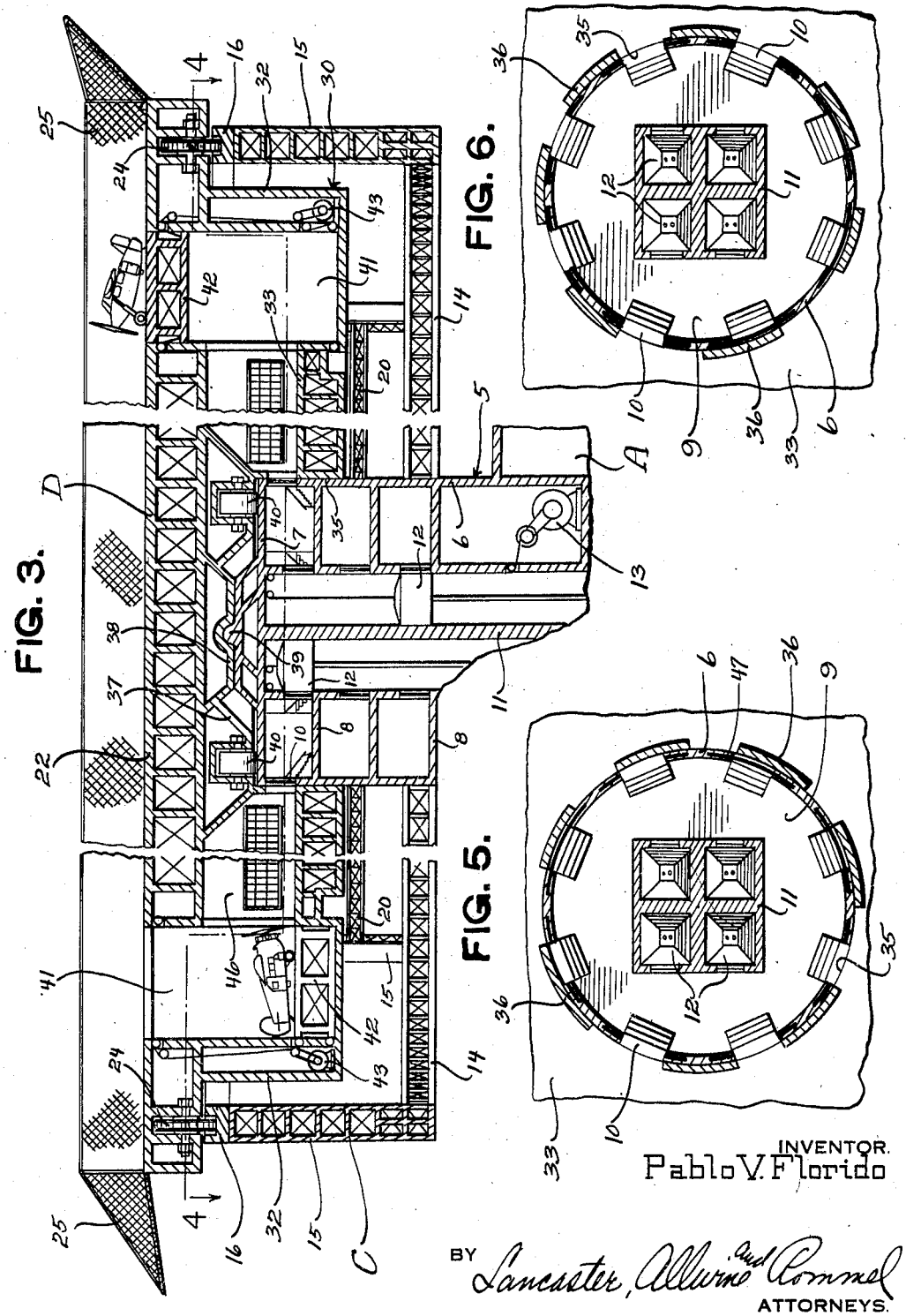
INVENTOR.
Pablo V. Florido
BY Lancaster, Allwine and Rommel
ATTORNEYS.

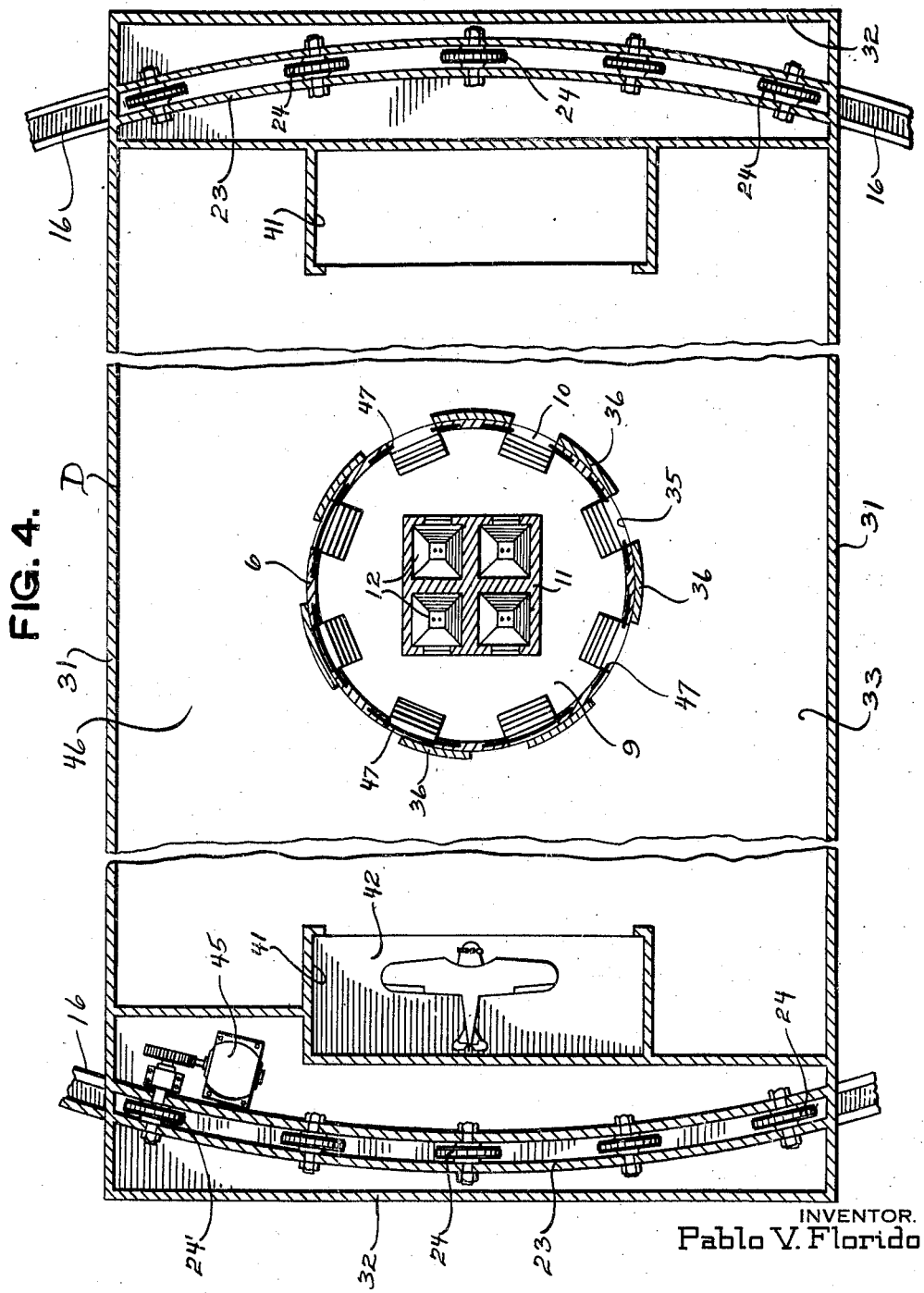

Patented July 14, 1931

1,814,985

UNITED STATES PATENT OFFICE

PABLO VILAR FLORIDO, OF THE UNITED STATES NAVY

AIRCRAFT LANDING APPARATUS

Application filed November 26, 1930. Serial No. 498,460.

The present invention relates to landing apparatus for aircraft and the primary object of the invention is to provide a construction for aircraft terminals for expediting passenger aerial travel and the handling of mail etc., by permitting the aerial terminal being located at any desired location such as in a congested portion of a large city or at locations where insufficient ground area may be had for landing purposes.

A further object of the invention is to provide an aircraft terminal adapted to be arranged upon the tops of a group of related buildings in a manner whereby the buildings form the sole support for the terminal and with the central building of the group providing means of communication between the terminal and the street level.

A further object of the invention is to provide elevated aircraft landing apparatus embodying a horizontally rotatable structure providing an elongated launching and landing platform or deck and beneath which is provided a closed hangar for loading and unloading passengers, with elevators arranged at each end of the hangar for raising and lowering the airplanes between the hangar and deck.

A further object resides in the novel arrangement wherein the waiting room serves as a hub and axial support for the horizontally rotatable structure, and the arrangement whereby communicating passageways will at all times be had between the circular waiting room and the hangar regardless of the position of rotation of the rotatable structure.

A further object of the invention is to provide aircraft landing apparatus which may be readily mounted upon existing building structures and without requiring that the buildings forming the supports for the apparatus all be of a like height.

Other objects and advantages of the invention will be apparent during the course of the following detailed description, taken in connection with the accompanying drawings and forming a part of this specification and in which drawings:

Figure 3 is an enlarged longitudinal section showing the apparatus broken away at each side of the axial center.

Figure 4 is a horizontal sectional view on the line 4—4 of Figure 3.

Figures 5 and 6 are fragmentary horizontal sections thru the circular waiting room and showing the arrangement whereby passageways will be opened from the waiting room to the hangar at various positions of the rotatable structure.

Figure 1:
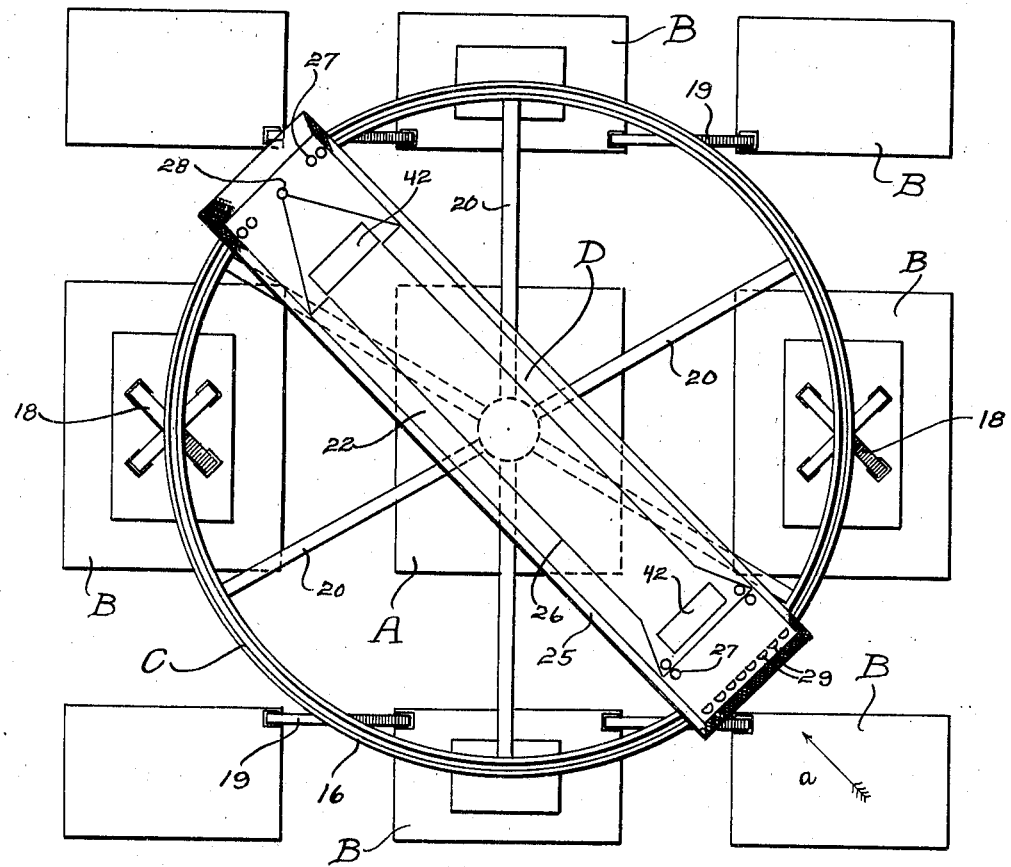
Figure 1 is a top plan view showing the manner in which the apparatus may be mounted upon the tops of a group of buildings.

Referring to the drawings in detail, and wherein similar reference characters designate corresponding parts thruout the several views, a landing apparatus has been shown supported upon the tops of a group of buildings one of which as designated at A is arranged at the axial center of the landing apparatus and forms a main central support and about which is arranged the buildings B forming auxiliary supports for the landing apparatus. The landing apparatus comprises a fixed or stationary supporting frame work C and a horizontally rotatable structure D providing a combined hangar and landing deck.

Figure 2:
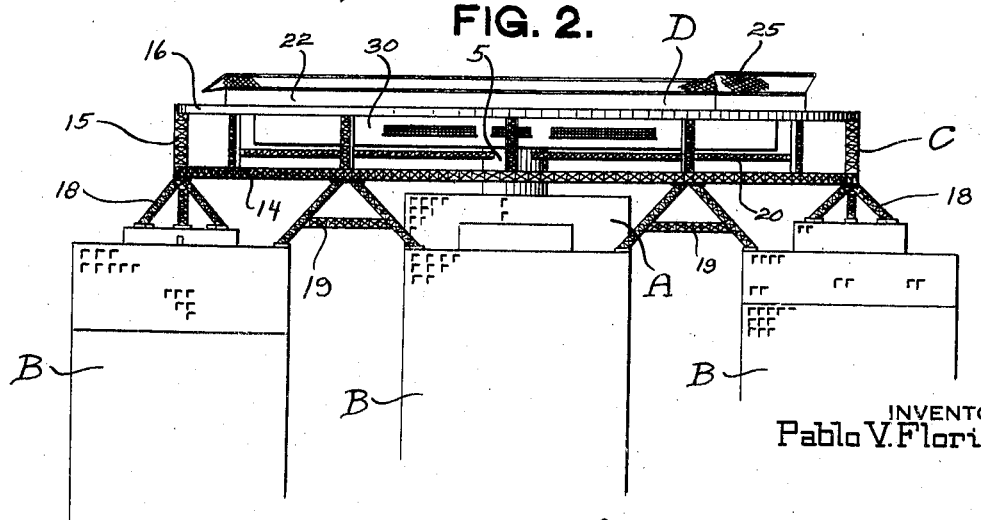
Figure 2 is a side elevation.

While in the diagrammatic top plan showing in Figure 1, the buildings B have been shown symmetrically arranged about the central main building A with streets or driveways between the buildings, the buildings B need not necessarily be arranged about the building A as shown to permit proper mounting of the apparatus but may be irregularly spaced so long as suitable supporting means may be provided for the marginal portions of the supporting frame work C. The buildings A and B provide base supporting structures for the landing apparatus and may be of various types and have different upper structures as shown in Figure 2.

The upper structure of the building A is provided with a round top structure 5 which projects above the roof of the building and provides a hub and axial support for the rotatable structure D. This structure or tower 5 is formed with an annular wall 6 closed at its upper end by a disc-like top wall 7 which aside from serving as the roof for the tower 5 also forms an axial bearing for the structure D. The tower 5 is provided with suitable floors 8 forming a series of superposed waiting rooms 9 the uppermost of which has communication thru a plurality of openings or doorways 10 with the hangar portion of the structure D. Provided at the axial center of the annular tower 5 is an elevator shaft 11 in which elevators 12 are arranged and operated by suitable motors as shown at 13.

Referring now to the supporting frame work C the same comprises a supporting ring including an annular base portion 14 which may be of open frame work construction and provided at equi-distantly spaced apart points with upwardly extending columns 15. Supported upon the upper ends of the columns 15 is an annular channel or U-shaped track 16 forming a support for the ends of the revolving structure D.

The frame work C is mounted at the annular base portion 14 by supports 18 and 19 suitably mounted upon the tops of the buildings B. These supports 18 and 19 will vary in construction and are to permit horizontal mounting of the frame work C upon the tops of various types of buildings. The supports 19 in the example shown serve to span the spaces between adjacent buildings and provide an arrangement whereby the supports 18 and 19 may be arranged at equi-distantly spaced points about the circumference of the supporting frame work. As will be observed, one of the supports 18 or 19 is arranged beneath each second column 15, there being twelve of the columns 15 and six supports for the frame work.

The annular supporting ring of the frame work C is reinforced by a series of six radially extending tie beams 20 having their inner ends suitably connected to the annular wall 6 of the tower 5 and their outer ends connected to the columns 15 which are arranged between the columns directly above the supports 18 and 19. These tie beams 20 as will be observed in Figures 2 and 3 are arranged a short distance above the annular base ring 14.

Referring now to the rotatable structure D the same includes an elongated launching and landing platform or deck 22 of any suitable width and of a length slightly greater than the diameter of the annular track 16. The deck may be suitably reinforced thruout its length and is provided in each end portion with an arcuate-shaped rack 23 in each of which is mounted a series of supporting rollers 24 which project slightly beneath the landing deck for engaging in the annular track 16. These rollers 24 are mounted with their axes converging toward the axis of the track 16 and the end rollers of each arcuate series of rollers are arranged closely adjacent the side edges of the landing track to prevent lateral tilting of the track.

Arranged about the edges of the deck 22 is a suitable netting 25 which is inclined upwardly and outwardly along the side edges and along the rear edge of the deck. The netting at the forward landing or take-off end of the deck is preferably inclined downwardly as shown in Figure 3 to permit proper landing and take-off from the deck. The upper surface of the deck has an arrow 26 painted or otherwise provided thereon with the pointed end of the arrow arranged at the landing or take-off end of the deck. Arranged at each end of the arrow are sets of red and green signal lights 27 while at the extreme point of the arrow is a light 28 arranged at the longitudinal center of the deck and indicating the landing end thereof. The rear end of the deck may be provided with a suitable number of landing lights 29 for illuminating the deck at night.

Arranged longitudinally beneath the deck portion 22 is a hangar structure 30 including side walls 31, end walls 32 and a floor 33 arranged below the flat top wall 7 of the tower 5. The hangar structure 30 is of such length as to have rotation inwardly of the track 16 and has its end portions wholly suspended from the deck 22. The floor 33 may be reinforced in any preferred manner and is provided at its axial center with a circular opening 35 providing an annular bearing surface for engagement with the circumference of the annular tower wall 6. Connected with, and projecting upwardly from the circumference of the opening 35 is a series of spaced apart arcuate wall sections 36 for movement past the doorways 10 upon rotation of the structure D.

The upper ends of the arcuate wall sections 36 are connected by a suitably braced hub structure 37 with the under side of the landing deck 22. This hub structure 37 is provided with a hub plate 38 having bearing engagement upon a companion hub plate 39 mounted axially of the top wall 7. As shown in Figure 3, the hub plate 39 is preferably provided with a rounded projection for engaging in a cupped depression in the plate 38. This ball and socket mounting of the plates 38 and 39 prevents radial shifting of the rotatable structure D and prevents any binding action of the annular surface of the opening 35 with the annular wall 6. The hub structure 37 is also provided with a series of annularly arranged rollers 40 which have rolling contact with the upper surface of the tower wall 7.

Provided in each end portion of the hangar 30 is a shaft 41 which open upwardly thru the deck 22 and in each of which is arranged a suitable lift 42 operated by suitable electric motors 43. These shafts 41 open thru the end portions of the arrow 26 and the lifts 42 which are vertically movable therein serve for raising and lowering the airplanes from the surface of the hangar floor 33 to the surface of the deck 22. When the lifts 42 are in raised position as shown by one of the lifts in Figure 3, they serve to close the shaft 41 and provide an unbroken surface for the deck 22.

As will be observed in Figure 4, the width of the hangar is considerably greater than the diameter of the tower 5 and thus passageways are provided about the tower to permit movement of the airplanes from one lift 42 to the other over the hangar floor 33. The area of the floor 33 not only allows ready loading and unloading of the passengers but also provides ample storage space for the airplanes.

Referring particularly to Figure 4, one of the supporting rollers as at 24' is connected by suitable gearing to an electric motor 45 serving as motive power for rotating the structure D upon the frame work C.

By observing Figures 4, 5 and 8 and wherein the structure D is shown in different positions of rotation about the tower structure 5 it will be seen that certain of the passageways 10 will be open at all times to form communication between the waiting chamber 9 and hangar chamber 46. The doorways 10 are preferably provided with sliding doors 47 whereby all of the doorways may be closed if such is desired.

Thus it will be seen that with an arrangement as shown the passengers may enter and leave the airplanes within the hangar chamber 46.

The object of having the deck 22 rotatable is to permit proper landing and take-off relative to the direction of the wind and the arrow 26 is arranged so as to point in the direction of the wind. In the showing in Figure 1, the landing deck is in the position for landing of an airplane when the wind is in the direction shown by the small arrow "a".

The object in providing the arcuate wall sections 36 is to provide means for pendently supporting the central portion of the hangar floor from the hub structure 37.

Thus it will be seen that a novel and improved construction for aircraft terminals has been disclosed adapted to be disposed above a group of buildings with the buildings forming the supporting structures for the terminal and one of the buildings serving as the communicating way between the terminal and street level. It will also be apparent that a novel arrangement has been shown for rotatably mounting the combined landing deck and hangar structure upon the tops of buildings in such manner as to permit proper landing of the airplanes relative to the wind conditions.

Changes in detail may be made to the form of invention herein shown and described, without departing from the spirit of the invention or the scope of the following claims.

I claim:

1. An aircraft terminal comprising habitable pier-like structures, a frame work mounted upon the top of the structures, and a combined hangar and landing deck horizontally rotatable upon the frame work and having entrance openings to one of the pier-like structures.

2. An aircraft terminal comprising a group of habitable structures, an open frame work mounted upon the structures, and a landing structure rotatably supported upon the frame work including a landing deck and a hangar having communication thru entrance ways with the upper portion of one of the habitable structures.

3. An aircraft terminal comprising a group of habitable structures, an open frame work mounted upon one of the structures, a landing deck horizontally rotatable upon the frame work, and a hangar arranged for rotation with the landing deck and having communicating passageways with one of the habitable structures.

4. In aircraft landing apparatus for mounting upon a group of buildings, a supporting frame work, means supporting the frame work upon the top of the buildings, and a combined hangar and landing deck horizontally rotatable upon the frame work and having entrance openings to a central building of the group.

5. An aircraft terminal comprising a group of habitable structures, an open frame work mounted upon the structures, a landing deck horizontally rotatable upon the frame work, and a hangar provided beneath the landing deck and rotatable therewith and having communication thru entrance ways with the upper portion of the centrally disposed structure of the group.

6. An aircraft terminal comprising a group of habitable supporting structures of varying height, a supporting frame work, means supporting the frame work in a horizontal position upon the habitable supporting structures, a landing deck horizontally rotatable upon the frame work and having rotatable bearing with one of the supporting structures and a hangar arranged beneath the landing deck and having communication thru entrance ways with one of the habitable supporting structures.

7. An aircraft terminal comprising a main habitable support having a circular top portion auxiliary supports about the main support, a frame work mounted upon the supports axially of the main support, a landing deck horizontally rotatable upon the frame work, and a hangar pendently supported beneath the landing deck for rotation therewith and having communication with the circular top portion of the main support thru entrance ways in the side wall of the circular top portion.

8. An aircraft terminal comprising a group of habitable structures providing a main central supporting structure, a circular top portion for the main structure and having radially opening passageways, a frame work supported upon the roof structures and including an annular track concentric to the circular top, a horizontally disposed landing deck, means rotatably supporting the ends of the deck upon the annular track, means rotatably supporting the central portion of the deck upon said circular top, and a hangar carried by the under side of the landing deck and having passageways communicating with the radially opening passageways in the circular top.

9. An aircraft terminal comprising a main habitable support having a circular top portion providing an annular wall having radially opening passageways, auxiliary supports about the main support, a frame work mounted upon the supports axially of the main support and including an annular track concentric to the circular top, a landing deck, means rotatably supporting the ends of the deck upon the annular track, means rotatably supporting the central portion of the deck upon the top of the circular top portion, a hangar supported beneath the landing deck providing a hangar chamber having communication with the radially opening passageways in said circular top portion, and means for vertically raising and lowering aircraft from the landing deck to the floor surface of the hangar.

10. In aircraft landing apparatus of the class described, a central supporting structure having a circular tower portion at its upper end providing a waiting room having radially opening passageways, a supporting frame work supported above the supporting structure including an annular track concentric to the tower, a landing deck rotatably supported at its ends upon the track and having its central portion extending above the tower, means rotatably supporting the central portion of the deck upon the tower, a hangar supported beneath the deck including a floor having a circular opening receiving the tower and arcuate wall sections having movement past the radially opening passageways, and means for vertically raising and lowering aircraft from the landing deck to the hangar floor.

11. In aircraft landing apparatus of the class described, a central supporting structure having a circular tower at its upper end providing a waiting room having radially opening passageways, auxiliary supports about the central support, a supporting frame work including an annular track, means supporting the frame work upon the auxiliary support, a horizontally disposed landing deck rotatably supported at its ends upon the track and having its central portion extending above the tower, a hub structure rotatably supporting the central portion of the deck upon the tower, a hangar pendently supported beneath the deck including a floor having a circular opening receiving the tower as a hub, said hangar floor being arranged below said radially opening passageways, an annular series of arcuate wall sections connecting the hangar floor and hub structure and having movement past said radially opening passageways, and an elevator for raising and lowering aircraft from the surface of the landing deck to the hangar floor.

12. In an aircraft terminal, a main habitable support provided at its upper end with a circular tower forming an annular wall having radially opening passageways, a frame work supported about the tower including an annular track concentric to the tower, a landing deck diametrically above the tower, means rotatably supporting the ends of the deck upon the track for horizontal rotation, a hub structure rotatably supporting the central portion of the deck upon the tower, a hangar pendently supported beneath the deck inwardly of the annular track and having a floor provided with a circular opening receiving the tower as a hub, an annular series of spaced apart arcuate wall sections connecting the hangar floor and hub structure and having movement past said radially opening passageways of the tower, and an elevator arranged at each end of the hangar for vertical movement of aircraft between the hangar floor and landing deck.

13. In an aircraft terminal, a main habitable support having a circular tower at its upper end providing a waiting room having an annular wall provided with doorways, elevators arranged axially in the tower, a frame work including an annular track supported concentrically about the tower, a landing deck rotatably supported at its ends on the annular track, means supporting the central portion of the track upon the tower, a hangar carried beneath the landing deck including a hangar chamber having a floor upon which said doorways open, said chamber providing passageways entirely about the annular tower wall, and an elevator arranged at each end of the hangar for vertical movement of aircraft between the floor of the hangar chamber and landing deck.

14. In aircraft landing apparatus, a circular tower having radially opening doorways, a supporting frame work including an annular track supported concentrically about the tower, a landing deck arranged diametrically of the track, means supporting the ends of the deck upon the track, means rotatably supporting the central portion of the deck upon the tower, means for horizontally rotating the landing deck, a hangar supported beneath the landing deck providing a chamber having communication with the tower thru said radially opening passageways, and an elevator at each end of the hangar chamber for raising and lowering aircraft from the hangar chamber to the landing deck.

15. In aircraft landing apparatus, a supporting tower providing a waiting room, a supporting frame work embodying an annular track concentric to the tower and connected thereto, an elongated landing deck arranged diametrically of the annular track, a series of arcuately arranged rollers at each end of the track for rolling movement upon the track, drive means connected with one of the rollers for imparting horizontal rotation with the landing deck, a hangar structure supported beneath the landing deck including a hangar chamber having communication with said tower thru the passageways, and means for raising and lowering aircraft from the landing deck to the floor of the hangar chamber.

16. In aircraft landing apparatus, a hub structure providing a waiting room, a supporting frame work about the hub structure including an annular track, a landing deck arranged diametrically above the structure, means rotatably supporting the ends of the deck upon the truck, a guard net about the side edges of the landing deck, an arrow delineated upon the upper side of the landing deck, a hangar structure supported beneath the deck providing a hangar chamber having communication with the tower thru said passageways, and a lift at each end of the hangar chamber for raising and lowering aircraft from the hangar chamber to the landing deck.

17. In aircraft landing apparatus, an annular tower providing a waiting room, an annular track mounted concentrically about the tower, a landing deck extended diametrically of the track, means rotatably supporting the ends of the deck upon the annular track and the intermediate portion thereof upon said tower, means for rotating the landing deck, a guard net about the edges of the landing deck, said net at the forward end of the landing deck being inclined downwardly from the floor surface of the deck, an arrow delineated upon the upper side of the landing deck, signal lights at each end of the deck, a signal light at the pointed end of the arrow indicating the landing and take-off end of the deck, landing lights across the rear end of the deck, a hangar structure supported beneath the landing deck providing a hangar chamber having communication with the tower, and lifts at each end of the hangar structure for raising and lowering aircraft from the landing deck to the hangar chamber.

PABLO VILAR FLORIDO.